United States Patent Office 3,174,959
Patented Mar. 23, 1965

3,174,959
POLYMERIZATION PROCESS USING A CATALYST SYSTEM COMPRISING AN ORGANO-ALUMINUM COMPOUND, A BENZOQUINONE, AND AN OXYGEN-CONTAINING GAS
Thomas E. Ferington, Silver Spring, Md., assignor to W. R. Grace & Co., New York, N.Y., a corporation of Connecticut
No Drawing. Filed July 5, 1963, Ser. No. 293,153
7 Claims. (Cl. 260—89.5)

This invention relates to a useful polymerization process. More particularly this invention is directed to the polymerization of non-gaseous vinyl monomers in film form particularly acrylic acid esters, using a novel catalyst system.

In a copending application having Serial No. 2,459,974, filed December 20, 1962, now abandoned, and assigned to the same assignee, there is disclosed a process for polymerizing vinyl monomers by mixing said monomer with an aluminum alkyl compound and exposing said mixture as a film or coating to an oxygen-containing atmosphere such as air. Although the polymer product especially in the case where the vinyl monomer is an ester of acrylic acid, is harder and has superior dimensional stability at elevated temperatures than the acrylates polymerized by prior art free radical systems, the polymer yields are low and the polymerization rate is in need of improvement.

Surprisingly it has now been found that non-gaseous vinyl monomers can now be polymerized as film or coating in increased yields at a rapid polymerization rate by exposing said monomers to the action of a catalyst consisting essentially of (1) 0.01 to 15% of an aluminum alkyl compound, (2) 0.05 to 1.0% benzoquinone and (3) a free oxygen-containing gas, e.g., air, ozone, or oxygen, said percentages being based on the weight of the vinyl monomer being polymerized.

The polymerization reaction is operable and preferable performed under ambient conditions, e.g., atmospheric pressure and temperature.

One method of performing this invention is to admix in air two deoxygenated streams, i.e., one stream containing a portion of the vinyl monomer and the aluminum alkyl compound and the other stream containing the remainder of the vinyl monomer and the benzoquinone. Preferably the stream containing the benzoquinone is not deoxygenated prior to admixture with the aluminum alkyl compound containing stream in practicing this invention. Polymer yields are slightly increased, approximately 3%, if deoxygenation of the benzoquinone containing stream is not performed. The two streams admixed by directing the streams against each other just prior to the streams hitting the surface on which the polyvinyl film or coating is to be formed. The streams can also be admixed by combining same just prior to exiting from a jet-type spray nozzle. It has been found that it is also possible to admix the vinyl monomer, aluminum alkyl compound and benzoquinone in the absence of free oxygen and thereafter spray the admixture as a film on a surface in the atmosphere to effect polymerization. However, in this latter method the yields are not quite as high as when the three catalytic components are mixed simultaneously in contact with the vinyl monomer.

The term "non-gaseous" used in conjunction with the vinyl monomers herein means that the monomer is not a gas under ambient or standard conditions of temperature and pressure. Thus the vinyl monomers are either liquid or solid. The term "vinyl monomers" herein means compounds of the formula

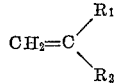

wherein $R_1$ is hydrogen or an organic radical and $R_2$ is an organic radical. The vinyl monomers are well-known in the art and include such materials as acrylic acid esters, methacrylic acid esters, vinyl nitriles, vinyl ethers and the like. Among the suitable acrylic acid esters which may be employed in the present invention are: methyl acrylate; ethyl acrylate; n-propyl acrylate; isopropyl acrylate; n-butyl acrylate; isobutyl acrylate; sec-butyl acrylate; tert-butyl acrylate; n-pentyl acrylate; n-pentyl acrylate; n-hexyl acrylate; 2-ethylbutyl acrylate; 2-ethyl-hexyl acrylate; n-heptyl acrylate; n-octyl acrylate; 3,5,5-trimethylhexyl acrylate; octadecyl acrylate; cyclopentyl acrylate; cyclohexyl acrylate; abitol acrylate (mixed isomers); n-decyl acrylate; tridecyl acrylate; 3,3,5-trimethylcyclohexyl acrylate; 2-n-butoxyethyl acrylate; 2-ethoxyethyl acrylate; 3-ethoxypropyl acrylate; 3-methoxybutyl acrylate; 2-methoxyethyl acrylate; benzyl acrylate; 2-phenoxyethyl acrylate; phenyl acrylate; 2-phenylethyl acrylate; 2-bromoethyl acrylate; 2-chloroethoxyethyl acrylate; 2-chloroethyl acrylate; 2,2,2-trifluoroethyl acrylate; N,N-diethylaminoethyl acrylate; 1,1-dihydroheptafluorobutyl acrylate, N,N-dimethylaminoethyl acrylate; 2-N-morpholinoethyl acrylate and tetrahydrofurfuryl acrylate.

Other suitable vinyl monomers include: abitol methacrylate; acrylamide; acrylonitrile; acrylyl chloride; allyl acetic acid; allylidene diacetate; N-ally acrylamide; aniline; ally crotonate; ally methacrylamide; ally methacrylate; n-amyl methacrylate; isoamyl methacrylate; benzyl methacrylate; 2-bromoethyl methacrylate; 2,2-butoxyethyl methacrylate; N-tert-butylacrylamide; sec-butyl methacrylate; iso-butyl methacrylate; tert-butyl methacrylate; 2-chloroethyl methacrylate; N-(parachlorophenyl)-acrylamide; N-(parachlorophenyl)-methacrylamide; 2-chlorostyrene; 3-chlorostyrene; 4-chlorostyrene; cinnamyl methacrylate; beta-cyanoethyl methacrylate; cyclohexyl methacrylate; cyclopentyl methacrylate; n-decyl methacrylate; N,N-diallylacrylamide; N,N-diallylmethacrylamide; 2,5-dichlorostyrene; N,N-diethylacrylamide; N,N-diethylaminoethyl methacrylate; 1,1-dihydroheptafluorobutyl methacrylate; N,N-dimethylallylamine; N,N-dimethylaminoethyl methacrylate; 2-ethoxyethyl methacrylate; ethylene dimethacrylate; 2-ethylhexoxyethyl methacrylate; 2-ethylhexyl methacrylate; ethyl methacrylate; furfuryl methacrylate; n-heptyl methacrylate; n-hexyl methacrylate; n-lauryl methacrylate; lauryl methacrylate; methacrylamide; 3-methoxylbutyl methacrylate; 2-methoxyethyl methacrylate; methyl methacrylate; alpha-methylstyrene; N-(beta-naphthyl) methacrylamide; octadecyl methacrylate; iso-propyl methacrylate; styrene; tetraethyleneglycol dimethacrylate, 3,3,5-trimethylcyclohexyl methacrylate; 3,5,5-trimethylhexyl methacrylate; vinyl acetate; vinyl n-butyl ether; vinyl isobutyl ether; vinyl butyrate; vinyl 2-chloroethyl ether; vinyl isobutyl ether; vinyl butyrate; vinyl 2-chlorethyl ether; vinyl n-decanoate; vinyl ethylether; vinyl 2-ethylhexoate; vinyl 2-ethylhexyl ether; vinyl iodide; vinyl laurate; vinyl methacrylate; vinyl 2-methoxyethyl ether; vinyl n-octanoate; vinyl oleate; vinyl phenylacetate; vinyl propionate and vinyl stearate. The monomers may be used individually or in various combinations to form copolymers. Many others are known in the art and may likewise be used.

By the term "aluminum alkyl compounds" as used throughout this invention is meant a compound having the general formula:

in which R is alkyl (e.g., methyl, ethyl, propyl, isopropyl, butyl, isobutyl, etc., including octyl, dodecyl, and so on); R' is H, Cl, or alkyl; and R" is either H or alkyl; provided that when R' is Cl, R" is alkyl. Among the various aluminum alkyl compounds which may be employed are triethyl aluminum; triethyl aluminum/ diethyl aluminum hydride mixtures; triisobutyl aluminum; trimethyl aluminum; diethyl aluminum chloride; trioctyl aluminum; tri-n-butyl aluminum; triisopropyl aluminum; tridodecyl aluminum; diethyl methyl aluminum; diethyl isobutyl aluminum; diethyl isobutyl aluminum; diisobutyl ethyl aluminum; diethyl aluminum bromide; dioctyl aluminum chloride; didodecyl aluminum chloride; diethyl aluminum hydride; diisobutyl aluminum hydride; dioctyl aluminum hydride and the like. The alkyl aluminum compounds may be employed individually or in various mixtures.

The amount of aluminum alkyl is not critical. As little as 0.01 weight percent based on the weight of the vinyl monomer is operable, and as much as 15% can be used. Amounts of the lower alkyls in excess of 15% are hazardous to use because of the inflammability of the aluminum alkyl at such concentrations. Even concentrations of the lower alkyls in the range of 10–15%, though operable, are too reactive to handle with ease. Expressed in mole percents, aluminum alkyl concentrations of 0.005–15 mole percent (of the vinyl monomer) are operable, the range of 0.01–10 mole percent being preferred. Even smaller amounts than 0.005 mole percent are operable, but are not recommended because yields are drastically reduced.

In practicing this invention the aluminum alkyl compound in the catalyst is preferably used in complex form to polymerize the vinyl monomers of the instant invention. The aluminum alkyl compound can be complexed with saturated or unsaturated esters of monocarboxylic acid, said acid having 1–20 carbon atoms. Examples of these complexing esters include, but are not limited to, ethyl acetate, ethyl propionate, vinyl propionate, vinyl acetate, ethyl acrylate, n-butyl acrylate, t-butyl acrylate, methyl methacrylate and the like. The complex can be made by preforming with efficient cooling, a mixture of the aluminum alkyl compound with the aforesaid saturated or unsaturated monocarboxylic esters in a mole ratio of 1:1 and thereafter adding said complex to the monomer. The use of the aluminum alkyl in complex form as a catalyst component decreases the exotherm of the reaction which occurs when the aluminum alkyl compound is mixed with the major portion of the monomer reactant and thus allows for better temperature control. Hence although the aluminum alkyl compound is operable without complexing, it is preferable to employ said compound in a complex form in the present invention.

The amount of benzoquinone used as a catalyst component in the present invention is in the range 0.05 to 1.0 weight percent based on the weight of the vinyl monomer being polymerized.

In practicing this invention, it has also been found that acrylic acid may, if desired, be added in amounts of 0.5 to 5% by weight based on the weight of the vinyl monomer, preferably 1.0 to 2.0% by weight, to increase the yield of polymer as will be shown by examples hereinafter.

On admixture of the reactants, namely, the vinyl monomer, aluminum alkyl compound and benzoquinone, it is important that the admixture is not exposed to free-oxygen prior to its desired use as film or coating. The storage life of the admixed reactants is shorter than desired, especially if acrylic acid is present and the reactants have not been thoroughly deoxygenated. By "storage life" is meant the time period during which the reactants can remain as a mixture without polymerization occurring. It has been found that the addition of maleic anhydride, e.g., dichloromaleic anhydride, added in amounts of 0.5 to 5% by weight based on the weight of the vinyl monomer preferably 1.0 to 2.0% by weight, increases the storage life considerably.

In the examples herein, unless otherwise noted, the general polymerization procedure was as follows. The aluminum alkyl compound was complexed in a deoxygenated rubber stoppered test tube with a saturated or unsaturated monocarboxylic ester, usually an acrylic acid ester, e.g., n-butyl acrylate in a 1:1 mole ratio at sub-zero temperature supplied by a Dry Ice-acetone bath. The complex is then allowed to warm to room temperature (25° C.) and a required amount of the complex is transferred by hypodermic syringe to a deoxygenated rubber stoppered test tube containing about one half of the vinyl monomer to be polymerized. Into another test tube was charged the required amount of benzoquinone and any other solid additive employed, as maleic anhydride. The tube was rubber stoppered and deoxygenated by passing nitrogen thru the tube via an inlet and outlet lance in the rubber stopper. After deoxygenation, the remainder of the vinyl monomer to be polymerized and any liquid additive such as acrylic acid was added to the tube by means of a deoxygenated hypodermic syringe. Any additives, such as maleic anhydride, acrylic acid, etc. used in practicing this invention can be added to a deoxygenated container holding the vinyl monomer, aluminum alkyl compound and benzoquinone without materially effecting the operability of the process. When the vinyl monomer is divided between two deoxygenated containers, i.e., one containing the vinyl monomer and benzoquinone and the other containing vinyl monomer and aluminum alkyl compound, although the additives can be added to either container, it is preferred that the additives be added to the container holding the benzoquinone. This is merely for ease of handling and to avoid continuous handling of the aluminum alkyl. The two test tubes containing the vinyl monomer and the catalyst were each gently shaken to obtain homogeneous mixing. Deoxygenated hypodermic syringes were employed to remove the mixtures from each test tube. The syringes were then directed to each other at an angle so as to admix the streams therefrom immediately before said streams contact and form a film coating on a preweighed glass plate in the atmosphere. The polymerization reaction initiates immediately on the streams contacting in the atmosphere. Generally the polymerization reaction is complete to whatever extent is possible within 3 to 5 minutes. The polymer film coating is dried to constant weight and the percent polymer yield is calculated.

In all the examples herein all parts and percentages are by weight.

The following examples will aid in understanding but will expressly not limit the invention.

EXAMPLE 1

6.3 ml. of pure diisobutyl aluminum hydride were charged to a deoxygenated serum-stoppered test tube placed in a Dry Ice-heptane cooling bath at minus 65–75° C. A nitrogen stream was continued through the tube while 5.0 ml. of deoxygenated n-butyl acrylate was added slowly thereto. The tube was removed from the bath still under a nitrogen blanket, and allowed to warm to room temperature with gentle shaking. The thus formed diisobutyl aluminum hydride:butyl acrylate complex had a mole ratio of 1:1 respectively. The complex was stored under $N_2$ until used in subsequent examples herein.

EXAMPLE 2

0.092 gram of the complexed aluminum alkyl compound from Example 1 were charged by means of a deoxygenated hypodermic syringe to a deoxygenated rubber stoppered test tube. 2.25 grams of deoxygenated n-butyl acrylate was then added to the tube by the same procedure. To another test tube was added .023 gram of benzoquinone and .022 gram of maleic anhydride. The test tube was rubber stoppered and deoxygenated by passing nitrogen through the tube by means of a removable inlet and outlet in the stopper. Following deoxygenation, 2.25 grams of n-butyl acrylate were added to the tube via a deoxygenated hypodermic syringe. After gently shaking both tubes deoxygenated hypodermic syringes were used to withdraw the contents of the tubes. The syringes were then directed at each other at an angle so as to admix the contents of the syringes immediately prior to their contacting and forming a film coating on a preweighed glass plate in the atmosphere. The polymerization was complete in about 5 minutes resulting in a firm coating of n-butyl acrylate polymer. After drying the coated plate to constant weight, the polymer yield was 31.3% by weight of the monomer. On characterization, no thermal degradation of the film product was noted after stepwise heating from 130 to 220° C. in a twelve hour period followed by 1 hour at 220° C.

EXAMPLE 3

Example 2 was repeated except that no benzoquinone was added to the system. After drying to constant weight, the yield of n-butyl acrylate polymer was 6.2% by weight of the monomer. A comparison of Examples 2 and 3 show the improvement in polymer yield obtained when benzoquinone is one of the catalyst components in the present invention.

EXAMPLE 4

Example 2 was repeated except that no acrylic acid and maleic anhydride was added to the system and .290 gram of complexed aluminum alkyl compound from Example 1 was used. The n-butyl acrylate polymer film coating after drying to constant weight resulted in a polymer yield of 57.0% by weight of the monomer.

EXAMPLE 5

Example 4 was repeated except that no benzoquinone was added to the system. The yield of n-butyl acrylate polymer film coating after drying to constant weight was 32.0% by weight of the monomer. A comparison of Examples 4 and 5 shows the increased yield obtainable when benzoquinone is used as one of the catalyst components.

The following examples in Table I show the operability of the instant invention with various amounts of the catalyst components. The procedure used was the same as in Example 2. In all examples in the table the aluminum alkyl compound was complexed with n-butyl acrylate in a 1:1 mole ratio as in Example 1.

Table I

| Example No. | Monomer,[a] Parts | Additives,[b] Parts/100 Parts Monomer | Complex,[c] Parts/100 Parts Monomer | Benzoquinone Parts/100 Parts Monomer | Percent Conversion Monomer To Polymer |
|---|---|---|---|---|---|
| 6 | 100 | 3.5 | 2.96 | 0 | 6.6 |
| 7 | 100 | 3.5 | 2.96 | 0.052 | 10.5 |
| 8 | 100 | 3.5 | 2.96 | 0.52 | 33.2 |
| 9 | 100 | 3.5 | 4.7 | 0 | 15.1 |
| 10 | 100 | 3.5 | 4.7 | 0.052 | 31.4 |
| 11 | 100 | 3.5 | 4.7 | 0.11 | 35.7 |
| 12 | 100 | 3.5 | 4.7 | 0.52 | 43.5 |
| 13 | 100 | 3.5 | 4.7 | 1.05 | 49.6 |
| 14 | 100 | 3.5 | 9.6 | 0 | 41.6 |
| 15 | 100 | 3.5 | 9.8 | 0.052 | 47.9 |
| 16 | 100 | 3.5 | 9.8 | 0.11 | 51.6 |
| 17 | 100 | 3.5 | 9.8 | 0.52 | 67.3 |
| 18 | 100 | 3.5 | 9.8 | 1.05 | 72.0 |

[a] Deoxygenated n-butyl acrylate.
[b] Additives in all examples in Table I consisted of 2.5 parts acrylic acid and 1.0 part maleic anyhdride/100 parts monomer.
[c] n-Butyl acrylate-diisobutyl aluminum hydride complex in a 1:1 mole ratio.

The following examples show the operability of the instant invention when the aluminum alkyl compound and the benzoquinone are admixed together in the presence of the vinyl monomer prior to exposing the system to oxygen.

EXAMPLE 19

50 parts n-butyl acrylate were charged to a deoxygenated rubber stoppered test tube immersed in a Dry Ice-acetone bath followed by 10 parts of diisobutyl aluminum hydride. The mixture was gently shaken after warming to room temperature. To another test tube was charged 1 part benzoquinone. The benzoquinone-containing test tube was rubber stoppered, deoxygenated with nitrogen as in Example 2 and charged with 50 parts n-butyl acrylate. Deoxygenated hypodermic syringes were used to remove the contents of both test tubes and charge same to preweighed sample dish in a nitrogen atmosphere. No observable polymer was formed in a 15 minute period. The nitrogen atmosphere was removed and the contents of the dish were exposed to air at atmospheric pressure and room temperature (25° C.). Polymerization occurred immediately. After drying to constant weight a 51.5% conversion of n-butyl acrylate monomer to polymer resulted.

EXAMPLE 20

Example 19 was repeated except that the monomer was t-butyl acrylate. A 59% conversion of monomer to polymer resulted.

EXAMPLE 21

Example 19 was repeated except that the monomer was methyl acrylate. A 46% conversion of monomer to polymer resulted.

EXAMPLE 22

Example 19 was repeated using ethyl acrylate as the monomer. A 45% conversion of monomer to polymer resulted.

Conventional fillers, dyes and pigments which do not react with the monomer mixture prior to exposing it to a free oxygen-containing gas (e.g., air) can be added to the composition prior to use within the scope of this invention.

I claim:
1. The process of polymerizing a non-gaseous ester of acrylic acid which comprises admixing said ester at ambient conditions with a catalyst consisting essentially of (a) 0.01 to 15% of an aluminum alkyl compound of the general formula

in which R is an alkyl; R' is a member of the group consisting of hydrogen, Cl, and alkyl; and R'' is a member of the group consisting of hydrogen and alkyl, provided that when R' is Cl, R'' is alkyl, all of said alkyls containing 1–12 carbon atoms, and (b) 0.05 to 1.0% benzoquinone and exposing said mixture to a free oxygen-containing gas.

2. The process according to claim 1 wherein the ester of acrylic acid is n-butyl acrylate.

3. The process according to claim 1 wherein the ester of acrylic acid is tert. butyl acrylate.

4. The process according to claim 1 wherein the ester of acrylic acid is ethyl acrylate.

5. The process according to claim 1 wherein the ester of acrylic acid is methyl acrylate.

6. The process according to claim 1 wherein the aluminum alkyl compound is complexed in a 1:1 mole ratio with an ester of a monocarboxylic acid, said acid having 1–20 carbon atoms.

7. The process according to claim 6 wherein the ester of a monocarboxylic acid is n-butyl acrylate.

(References on following page)

References Cited by the Examiner

UNITED STATES PATENTS

| | | | |
|---|---|---|---|
| 2,129,664 | 9/38 | Barrett et al. | 260—86.1 |
| 2,699,457 | 1/55 | Ziegler et al. | 260—94.9 |
| 2,868,771 | 1/59 | Ray et al. | 260—94.9 |
| 3,117,112 | 1/64 | Mirabile et al. | 260—89.5 |

OTHER REFERENCES

Furukawa et al.: J. Pol. Sci. 31 (1958), pp. 247–9.
Furukawa et al.: Die Makromol. Chemie, 30 (1958), pp. 109–22.

JOSEPH L. SCHOFER, *Primary Examiner*.
DONALD E. CZAJA, *Examiner*.